United States Patent
Ruckart

(10) Patent No.: US 9,014,973 B2
(45) Date of Patent: Apr. 21, 2015

(54) METHODS FOR OBTAINING A NAVIGATION TRACK BETWEEN A FIRST AND A SECOND LOCATION AT A CLIENT DEVICE USING LOCATION INFORMATION OBTAINED FROM A SERVER DEVICE AND RELATED DEVICES AND COMPUTER PROGRAM PRODUCTS

(75) Inventor: John Ruckart, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1446 days.

(21) Appl. No.: 11/710,140

(22) Filed: Feb. 23, 2007

(65) Prior Publication Data

US 2008/0208467 A1    Aug. 28, 2008

(51) Int. Cl.
  *G08B 1/00*   (2006.01)
  *G01C 21/26*  (2006.01)

(52) U.S. Cl.
  CPC ..................... *G01C 21/26* (2013.01)

(58) Field of Classification Search
  USPC ......... 701/207, 210, 201, 213, 426, 467–469; 340/988, 539.13; 455/404.2, 456, 457, 455/456.5, 422.1, 418, 456.1–456.3, 412.1, 455/412.2, 414.1; 342/357.06, 357.1; 379/226, 229; 725/62, 112; 715/864, 715/205; 348/14.02; 726/26, 2; 709/219, 709/203
  See application file for complete search history.

(56) References Cited

U.S. PATENT DOCUMENTS

| | | | |
|---|---|---|---|
| 6,826,473 B1 * | 11/2004 | Burch et al. ................. 701/467 |
| 7,085,629 B1 | 8/2006 | Gotou et al. |
| 7,200,848 B1 * | 4/2007 | Slaughter et al. ............. 719/317 |
| 7,260,378 B2 * | 8/2007 | Holland et al. ............ 455/404.2 |
| 7,292,867 B2 * | 11/2007 | Werner et al. .............. 455/456.3 |
| 7,412,518 B1 * | 8/2008 | Duigou et al. ................ 709/227 |
| 7,480,512 B2 * | 1/2009 | Graham et al. ............ 455/456.3 |
| 7,606,938 B2 * | 10/2009 | Roese et al. .................. 709/242 |
| 8,395,547 B2 * | 3/2013 | Dhanani et al. ............... 342/451 |
| 8,599,801 B2 * | 12/2013 | Baio et al. ..................... 370/338 |
| 8,768,307 B1 * | 7/2014 | Heins et al. ................ 455/412.1 |
| 2003/0078987 A1 * | 4/2003 | Serebrennikov .............. 709/217 |
| 2004/0158607 A1 * | 8/2004 | Coppinger et al. .......... 709/206 |
| 2005/0014482 A1 * | 1/2005 | Holland et al. ............ 455/404.1 |
| 2005/0020242 A1 * | 1/2005 | Holland et al. ............ 455/404.2 |
| 2005/0020280 A1 * | 1/2005 | Holland et al. ............ 455/456.1 |

(Continued)

OTHER PUBLICATIONS

A general architecture in support of interactive, multimedia, location-based mobile applications; Barbeau, S.J.; Labrador, M.A.; Winters, P.L.; Perez, R.; Georggi, N. L.; Communications Magazine, IEEE; vol. 44, Issue 11, Nov. 2006 pp. 156-163; Digital Object Identifier 10.1109/MCOM.2006.248179.*

(Continued)

*Primary Examiner* — Cuong H Nguyen

(74) *Attorney, Agent, or Firm* — Myers Bigel Sibley & Sajovec, PA

(57) ABSTRACT

A client device is operated to obtain a navigation track between a first location and a second location by establishing a communication connection with a server device and receiving a message that contains information associated with the first location and/or the second location from the server device. The information is associated with a navigation module on the client device. The information associated with the first location and/or the second location is processed using the navigation module to obtain the navigation track between the first location and the second location.

14 Claims, 10 Drawing Sheets

(56) References Cited

U.S. PATENT DOCUMENTS

| | | | | |
|---|---|---|---|---|
| 2005/0048947 | A1* | 3/2005 | Holland et al. | 455/404.1 |
| 2005/0048948 | A1* | 3/2005 | Holland et al. | 455/404.1 |
| 2005/0114367 | A1* | 5/2005 | Serebrennikov | 707/100 |
| 2007/0066283 | A1* | 3/2007 | Haar et al. | 455/412.2 |
| 2007/0083906 | A1* | 4/2007 | Welingkar | 725/110 |
| 2007/0111703 | A1* | 5/2007 | Holland et al. | 455/404.2 |
| 2007/0188319 | A1* | 8/2007 | Upton | 340/539.13 |
| 2007/0199076 | A1* | 8/2007 | Rensin et al. | 726/27 |
| 2008/0045236 | A1* | 2/2008 | Nahon et al. | 455/456.1 |
| 2008/0046298 | A1* | 2/2008 | Ben-Yehuda et al. | 705/6 |
| 2008/0195702 | A1 | 8/2008 | Matz | |
| 2008/0208467 | A1* | 8/2008 | Ruckart | 701/213 |
| 2009/0156229 | A1* | 6/2009 | Hein et al. | 455/456.1 |
| 2009/0286549 | A1* | 11/2009 | Canon et al. | 455/456.1 |

OTHER PUBLICATIONS

Attaching context-aware services to moving locations; Kanter, T.G.; Internet Computing, IEEE; vol. 7, Issue 2, Mar.-Apr. 2003 pp. 43-51; Digital Object Identifier 10.1109/MIC.2003.1189188.*

Integration of an advanced emergency call subsystem into a car-gateway platform; Madrid, N.M.; Seepold, R.; Nieves, A.R.; Gomez, J.S.; los Santos Aransay, A.; Velasco, P.S.; Morales, C.R.; Ares, F.; Design, Automation & Test in Europe Conference & Exhibition, 2009. Date '09;Apr. 20-24, 2009 pp. 1100-1105.*

SDP-based IP and Multimedia real time communications integration with vehicle remote monitoring, monitoring and emergency systems;Maes, S.H.; ITS Telecommunications, 2008. ITST 2008. 8th International Conference on; Oct. 24-24, 2008 pp. 328-333; Digital Object Identifier 10.1109/ITST.2008.4740280.*

Towards "Guardian Angels" and Improved Mobile User Experience; Falchuk, B.; Loeb, S.; Global Telecommunications Conference, 2008. IEEE GLOBECOM 2008. IEEE; Nov. 30, 2008-Dec. 4, 2008 pp. 1-5; Digital Object Identifier 10.1109/GLOCOM.2008.ECP. 345.*

A General Architecture of Mobile Social Network Services; Yao-Jen Chang; Hung-Huan Liu; Li-Der Chou; Yen-Wen Chen; Haw-Yun Shin; Convergence Information Technology, 2007. International Conference on; Nov. 21-23, 2007 pp. 151-156 Digital Object Identifier 10.1109/ICCIT.2007.132.*

Contextual Usage-Level Analysis of Mobile Services; Verkasalo, H.; Mobile and Ubiquitous Systems: Networking & Services, 2007. MobiQuitous 2007. Fourth Annual International Conference on; Aug. 6-10, 2007 pp. 1-8; Digital Object Identifier 10.1109/MOBIQ. 2007.4451023.*

Mobile Social Assistive Technology: A Case Study in Supported Employment for People with Severe Mental Illness;Yao-Jen Chang; Hung-Huan Liu; Tsen-Yung Wang;Convergence and Hybrid Information Technology, 2008. ICCIT '08. Third International Conference on; vol. 1, Nov. 11-13, 2008 pp. 442-447;Digital Object Identifier 10.1109/ICCIT.2008.289.*

Sawhney, Nitin et al. Speaking and Listening on the Run: Design for Wearable Audio Computing, Speech Interface Group, MIT Media Laboratory, Oct. 19-20, 1998, Pittsburgh, Pennsylvania.*

Sawhney, Nitin et al.; Speaking and Listening on the Run: Design for Wearable Audio Computing; Proceedings of ISWC'98, International Symposium on Wearable Computing, Oct. 19-20, 1998, Pittsburgh, PA; Copyright 1998 IEEE.*

Mehaffey et al.; Garmin's NAVTALK Cell Phone and Road Map GPS Product Review; Revision 2, Nov. 2, 1999; 5 Pages.*

Development of smartphone-based public vigilance systems; Panchul, A.; Akopian, D.; Chen, P.; Automation Congress, 2008. WAC 2008. World; Publication Year: 2008 , pp. 1-6.*

A future location-prediction replacement strategy for mobile computing environments; Drakatos, S. et al.; Wireless Communications and Networking Conference, 2006. WCNC 2006. IEEE; vol. 4; Digital Object Identifier: 10.1109/WCNC.2006.1696646; Publication Year: 2006 , pp. 2252-2260.*

Using smart phones to access site-specific services; Toye, E. et al..; Pervasive Computing, IEEE; vol. 4 , Issue: 2 Digital Object Identifier: 10.1109/MPRV.2005.44; Publication Year: 2005 , pp. 60-66.*

Privacy-Preserving Location-Dependent Query Processing; Atallah, M.J. et al.; Pervasive Services, 2004. ICPS 2004. IEEE/ACS International Conference on; Digital Object Identifier: 10.1109/PERSER. 2004.24; Publication Year: 2004 , pp. 9-17.*

Click4BuildingID@NTU: Click for Building Identification with GPS-enabled Camera Cell Phone; Chai Kiat Yeo et al..; Multimedia and Expo, 2007 IEEE International Conference on; Digital Object Identifier: 10.1109/ICME.2007.4284836; Publication Year: 2007 , pp. 1059-1062.*

Jing, J., et al., "Client Server Computing in Mobile Environments", ACM Computing Surveys, (Jun. 1999), pp. 117-157, vol. 31, Issue 2, ACM Press.*

Mel B. W. et al., "Tablet: Personal Computer in the Year 2000", Communications of the Association for Computing machinery, New Your, NY vol. 31, No. 6, Jun. 1, 1988, 639-646 XP000047633ISSN: 0001-0782.*

Stein, Augmented reality: iPhone 3G S killer app?, printed from Internet address: http://news.cnet.com/8301-17938.sub.--105-10266380-1.html on Dec. 9, 2009, 3 pages.*

Sevanto, J. et al., "Introducing quality-of-service and traffic classes in wireless mobile networks", Proceedings of the 1 st ACM International workshop on Wireless mobile multimedia (1999), pp. 21-29, ACM Press.*

Diploma: Consistent and coherent shared memory over mobile phones; Gao, J. ; Sivaraman, A. ; Agarwal, N. ; Haoqi Li ; Peh, L L. Computer Design (ICCD), 2012 IEEE 30th International Conference on; DOI: 10.1109/ICCD.2012.6378666; Publication Year: 2012 , pp. 371-378.*

GPS Locator: An Application for Location Tracking and Sharing Using GPS for Java Enabled Handhelds; Chandra, A. ; Jain, S. ; Qadeer, M.A.; Computational Intelligence and Communication Networks (CICN), 2011 International Conference on DOI: 10.1109/CICN.2011.85; Publication Year: 2011 , pp. 406-410.*

A distributed approach to GIS systems and location-based service for internet-enabled handheld mobile devices; Roy, A. ; Mitra, A. ; Bhattacharya, H. ; Shibasis Biswas ; Das, P.K.; Wireless, Mobile and Multimedia Networks, 2008. IET International Conference on Publication Year: 2008 , pp. 192-195.*

Research on GPRS vehicle location network service system; Yougui Liu ; Baoxing Bai; Computer, Mechatronics, Control and Electronic Engineering (CMCE), 2010 International Conference on; vol. 4; DOI: 10.1109/CMCE.2010.5610118 Publication Year: 2010 , pp. 401-404.*

* cited by examiner

METHODS FOR OBTAINING A NAVIGATION TRACK BETWEEN A FIRST AND A SECOND LOCATION AT A CLIENT DEVICE USING LOCATION INFORMATION OBTAINED FROM A SERVER DEVICE AND RELATED DEVICES AND COMPUTER PROGRAM PRODUCTS

BACKGROUND OF THE INVENTION

The present invention relates generally to communication networks and devices that operate thereon and, more particularly, to sharing location information between devices on a communication network.

When people communicate today through, for example, email, Instant Messaging (IM) programs, Short Message Service (SMS) messages, etc., the messages are often limited to simple text information and/or attachments containing text, graphic files, audio files, video files, and the like. When people plan to meet at a specific place, individuals typically try to describe the location or, if known, provide a street address or other type of identifying information, which the recipient may then provide as input to a mapping application, such as, for example, mapping applications provided Yahoo, Google, and Mapquest. Similarly, if a computer user is reviewing a Website of a business and decides he/she wants to visit the business, the user may obtain the address of the business from the Website and provide that address to a mapping application as described above. Alternatively, the business Website may provide a link to a map that contains directions to the business location when approaching from various locations. Thus, for a user to obtain more detailed information about a location, such as, for example, directions from a current location or reference information related to the location, the user may need to make use of a public mapping application or seek out the detailed information on a Website or other location information source. Services, such as evite.com, may allow email invitations to be sent with a link to a map for a given address. The recipient may still need to print the map and directions or hand write the directions to make effective use of the map and/or directions, however.

SUMMARY

According to some embodiments of the present invention, a client device is operated to obtain a navigation track between a first location and a second location by establishing a communication connection with a server device and receiving a message that contains information associated with the first location and/or the second location from the server device. The information is associated with a navigation module on the client device. The information associated with the first location and/or the second location is processed using the navigation module to obtain the navigation track between the first location and the second location.

In other embodiments of the present invention, the information is saved at the client device and the communication connection with the server device is ended before processing the information.

In still other embodiments of the present invention, the server device is a Web server device and the communication connection is a HyperText Transfer Protocol (HTTP) communication connection.

In still other embodiments of the present invention, processing the information comprises accessing a navigation information repository on the client device to determine the navigation track between the first location and the second location.

In still other embodiments of the present invention, processing the information comprises accessing a remote navigation information repository via a communication connection therewith to determine the navigation track between the first location and the second location.

In still other embodiments of the present invention, the first location is a current location of the client device.

In still other embodiments of the present invention, the determined navigation track is updated responsive to changes in the current location of the client device.

In still other embodiments of the present invention, neither of the first location and second location is a current location of the client device.

In still other embodiments of the present invention, the first location and/or the second location is sent to the server device before receiving the information.

In still other embodiments of the present invention, the information associated with the first location and/or the second location comprises Global Positioning System (GPS) information, cellular technology location information, an address, and/or a name.

In still other embodiments of the present invention, the GPS information is encoded in a GPS eXchange (GPX) format.

In still other embodiments of the present invention, the information associated with the first location and/or the second location comprises at least one waypoint between the first location and the second location, and the obtained navigation track between the first location and the second location includes the at least one waypoint.

In still other embodiments of the present invention, the message comprises a Short Message Service (SMS) text message, a hyperlink, an electronic mail, a directory listing, an advertisement, and/or a Voice over Internet Protocol (VoIP) call. In addition, the location information may be an attachment to the message and/or is embedded in the message using at least one delimiter.

In further embodiments of the present invention, a server device is operated by establishing a communication connection with a client device, and sending a message that contains information associated with a first location and/or a second location to the client device. The information is associated with navigation module on the client to allow the client device to process the information and to obtain the navigation track between the first location and the second location.

In still further embodiments, the first location and/or the second location is received from the client device before sending the information.

In still further embodiments, the information associated with the first location and/or the second location comprises at least one waypoint between the first location and the second location. The information associated with the first location and/or the second location comprises a Short Message Service (SMS) text message, a hyperlink, an electronic mail, a directory listing, an advertisement, and/or a Voice over Internet Protocol (VoIP) call. In addition, the location information may be an attachment to the message and/or is embedded in the message using at least one delimiter.

Although described primarily above with respect to method embodiments of the present invention, it will be understood that the present invention can be embodied as methods, client devices, server devices, and/or computer program products.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
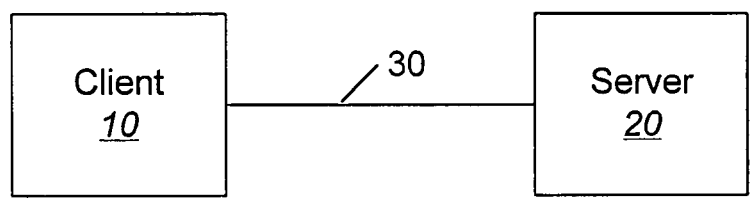
FIG. 1 is a block diagram that illustrates a client-server environment in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps; operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

As used herein, the term "message" means a unit of information and/or a block of data that may be transmitted electronically as a whole or via segments from one device to another. Accordingly, as used herein, the term "message" may encompass such terms of art as "frame" and/or "packet," which may also be used to refer to a unit of transmission.

For purposes of illustration, some embodiments of the present invention are described herein in the context of a client device being a mobile terminal. It will be understood, however, that the present invention is not limited to such embodiments and that a client device may be embodied as any electronic device that is configured to process location information received, for example, from a server device.

Some embodiments of the present invention stem from a realization that location information may be attached to and/or embedded in a message similar to the manner in which documents, files, hyperlinks, metadata, and packet headers are attached to and/or embedded in messages. The location information may be associated with a navigation module on the receiving device, which is used to process the location information to obtain a navigation path. Processing the location information could be automatic in that the navigation module automatically extracts and processes the location information contained in the message. In other embodiments, the location information may not be processed until a user of the client device performs an action to begin processing of the information.

Embodiments according to the invention can operate in a logically separated client side/server side-computing environment, sometimes referred to hereinafter as a client/server environment. As shown in FIG. 1, a client 10 may communicate with a server 20 over a wireless and/or wireline communication medium 30. The client/server environment is a computational architecture that involves a client process (i.e., a client) requesting service from a server process (i.e., a server). In general, the client/server environment maintains a distinction between processes, although client and server processes may operate on different machines or on the same machine. Accordingly, the client and server sides of the client/server environment are referred to as being logically separated. Usually, when client and server processes operate on separate devices, each device can be customized for the needs of the respective process. For example, a server process can "run on" a system having large amounts of memory and disk space, whereas the client process often "runs on" a system having a graphic user interface provided by high-end video cards and large-screen displays.

A client can be a program, such as a Web browser, that requests information, such as web pages, from a server under the control of a user. Examples of clients include browsers such as Netscape Navigator® (America Online, Inc., Dulles, Va.) and Internet Explorer® (Microsoft Corporation, Redmond, Wash.). Browsers typically provide a graphical user interface for retrieving and viewing web pages, web portals, applications, and other resources served by Web servers. A SOAP client can be used to request web services programmatically by a program in lieu of a web browser. The applications provided by the service providers may execute on a server. The server can be a program that responds to the requests from the client. Some examples of servers are International Business Machines Corporation's family of Lotus Domino® servers, the Apache server and Microsoft's Internet Information Server (IIS) (Microsoft Corporation, Redmond, Wash.).

The clients and servers can communicate using a standard communications mode, such as Hypertext Transport Protocol (HTTP) and SOAP. According to the HTTP request-response communications model, HTTP requests are sent from the client to the server and HTTP responses are sent from the server to the client in response to an HTTP request. In operation, the server waits for a client to open a connection and to request information, such as a Web page. In response, the server sends a copy of the requested information to the client, closes the connection to the client, and waits for the next connection. It will be understood that the server can respond to requests from more than one client.

Figure 2:
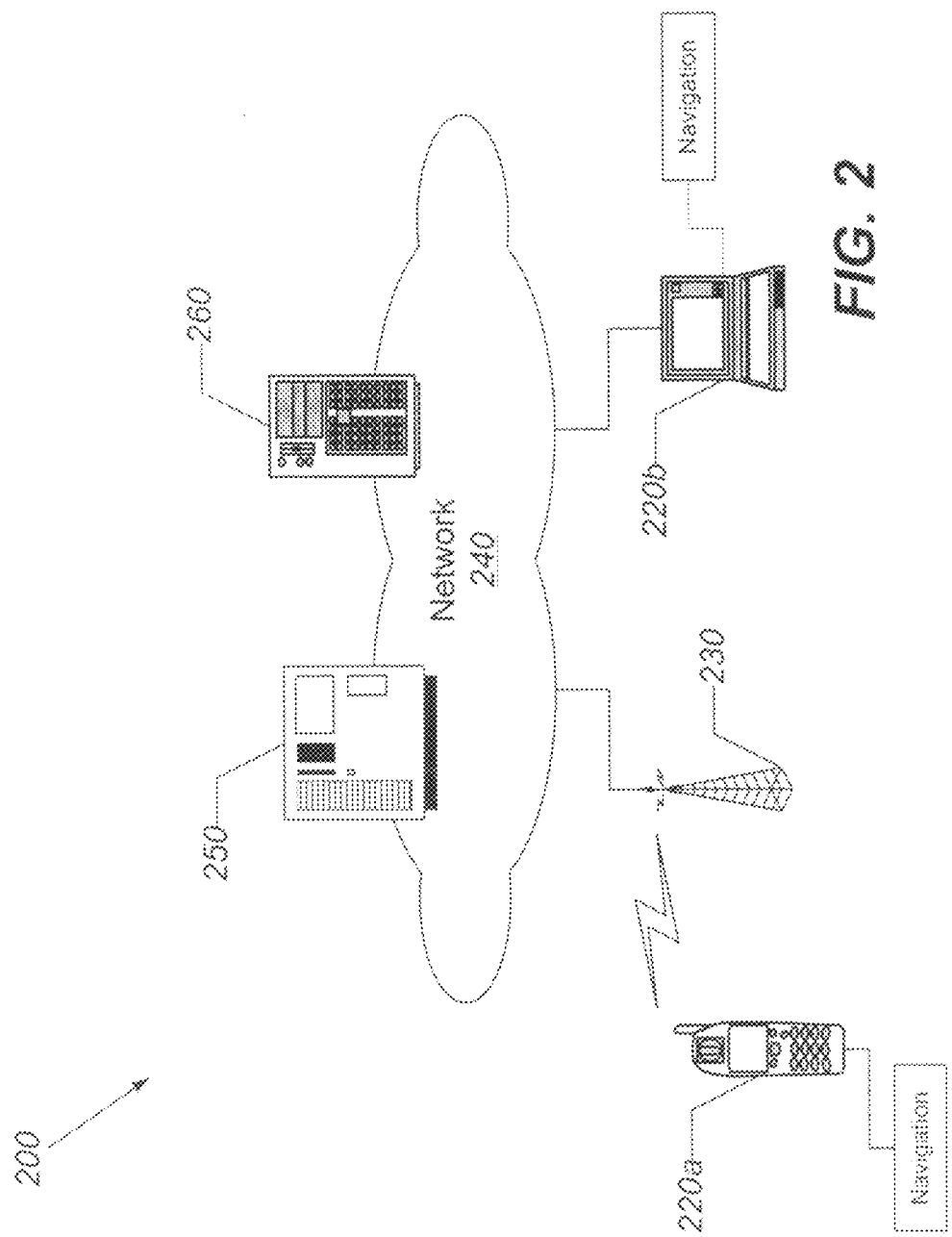
FIG. 2 is a block diagram that illustrates a communication network architecture to facilitate obtaining a navigation track at a client device based on location information received from a server device in accordance with some embodiments of the present invention.

Referring now to FIG. 2, a network architecture 200 that facilitates obtaining a navigation track at a client device based on location information received from a server device, according to some embodiments of the present invention, includes client devices 220a and 220b, a navigation information repository server 250, and a server 260 that are connected via a network 240 as shown. The network 240 includes a wireless base station-transceiver 230 that may facilitate wireless communication with the mobile client terminal 220a. The navigation information repository server 250 may be accessed by other devices to obtain navigation information therefrom and/or to process navigation information to determine a navigation track. A navigation track is the actual path followed by or intended for a moving body. As will be discussed further herein, the server 260 may communicate with a client device, such as client devices 220a and 220b to transmit a message thereto that contains location information attached thereto or embedded therein. The location information is associated with navigation modules on the client devices 220a and/or 220b, which process the location information. The network 240 may represent a global network, such as the Internet, or other publicly accessible network. The network 240 may also, however, represent a wide area network, a local area network, an Intranet, or other private network, which may not accessible by the general public. Furthermore, the network 240 may represent a combination of public and private networks or a virtual private network (VPN). Moreover, client device 220a is described as a mobile terminal for purposes of illustrating some embodiments of the present invention. It will be understood, however, that the present invention is not limited to such embodiments and that a client device may be embodied as any electronic device that is configured to process location information received, for example, from a server device, such as server device 260. Thus, according to various embodiments of the present invention, a client device may be a mobile terminal such as client device 220a, or may be relatively stationary, such as client device 220b.

Although FIG. 2 illustrates an exemplary communication network, it will be understood that the present invention is not limited to such configurations, but is intended to encompass any configuration capable of carrying out the operations described herein.

Figure 3:
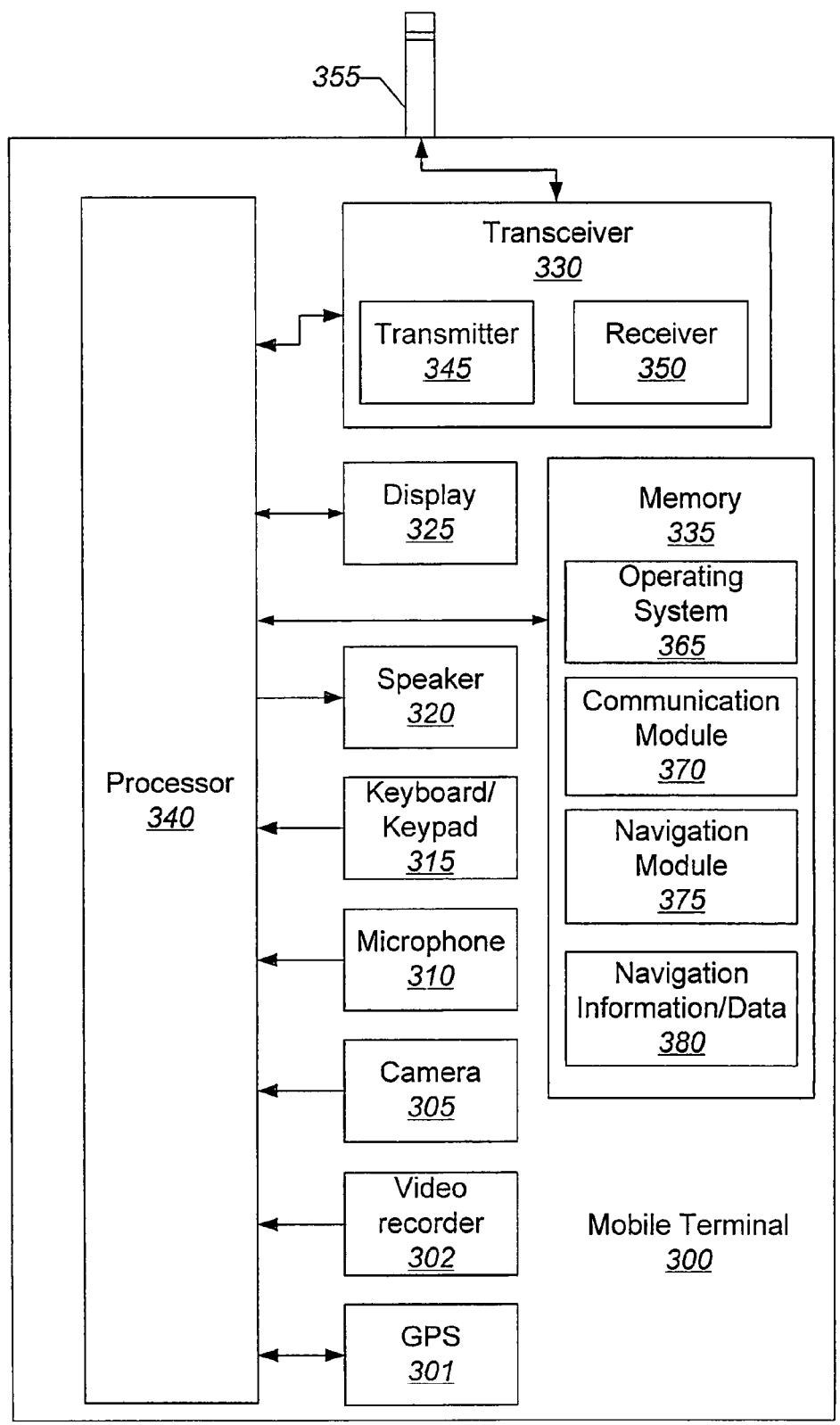
FIG. 3 is a block diagram that illustrates a client device/mobile terminal in accordance with some embodiments of the present invention.

Referring now to FIG. 3, an exemplary mobile terminal 300 that may be used to implement a client device, such as client device 220a of FIG. 2, in accordance with some embodiments of the present invention, includes a Global Positioning System (GPS) module 301, a video recorder 302, a camera 305, a microphone 310, a keyboard/keypad 315, a speaker 320, a display 325, a transceiver 330, and a memory 335 that communicate with a processor 340. The transceiver 330 comprises a transmitter circuit 345 and a receiver circuit 350, which respectively transmit outgoing radio frequency signals to base station transceivers and receive incoming radio frequency signals from the base station transceivers via an antenna 355. The radio frequency signals transmitted between the mobile terminal 300 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 300 may be included in many conventional mobile terminals and their functionality is generally known to those skilled in the art.

The processor 340 communicates with the memory 335 via an address/data bus. The processor 340 may be, for example, a commercially available or custom microprocessor. The memory 335 is representative of the one or more memory devices containing the software and data used to operate the mobile terminal and to process location information received from, for example, a server device. The memory 335 may include, but is not limited to, the following types of devices: cache, ROM, PROM, EPROM, EEPROM, flash, SRAM, and DRAM.

As shown in FIG. 3, the memory 335 may contain four or more categories of software and/or data: the operating system 365, a communication module 370, a navigation module 375, and/or a navigation information/data module 380. The operating system 365 generally controls the operation of the mobile terminal 300. In particular, the operating system 365 may manage the mobile terminal's software and/or hardware resources and may coordinate execution of programs by the processor 340. The communication module 370 may be configured to manage the communication protocols that are used to allow the mobile terminal 300 communicate with other devices and systems. The navigation module 375 may be configured to process a message received, for example, from a server device and extract location information therefrom.

In accordance with various embodiments of the present invention, the location information may be attached to the message or may be embedded in the message using one or more delimiters. The navigation module 375 may use the received location information in conjunction with the navigation information/data module 380 to obtain a navigation track between two locations. The navigation information/data module 380 may, for example, include geographic information/data for a particular area, region, or even the world.

The navigation module 375 may also cooperate with the communication module 370 to access a remote navigation information repository, such as server 250 of FIG. 2. Similar to the navigation information/data module 380, the navigation information repository server 250 may include geographic information/data, which is communicated back to the client device. In some embodiments, the client device may send the location information extracted from the received message to the navigation information repository server 250, which processes the received location information and communicates a navigation track back to the client device.

In accordance with some embodiments of the present invention, the location information may identify one or more locations and may be associated with the navigation module 375 for processing. The location information may be included in a message such as a Short Message Service (SMS) text message, a hyperlink, an electronic mail, a directory listing, an advertisement, and/or a Voice over Internet Protocol (VoIP) call. The location information may be GPS information, an address, and/or a name in accordance with some embodiments of the present invention. The GPS information may be encoded, for example, in the GPS eXchange Format (GPX), which is an Extensible Markup Language (XML) standard for communicating GPS data between software applications. In other embodiments, the location information may include cellular/Wi-Fi technology location information. For example, cellular/Wi-Fi technology may be used to track the current position of a mobile terminal. The base stations in a wireless network that are used to transmit and receive the cellular/Wi-Fi communication signals may monitor the relative signal strength as a mobile terminal changes locations. An approximate location of a mobile terminal may be determined based on the signal strength received at multiple base stations.

Although FIG. 3 illustrates an exemplary software and hardware architecture that may be used to process location information received in a message at a client device it will be understood that the present invention is not limited to such a configuration, but is intended to encompass any configuration capable of carrying out the operations described herein.

Computer program code for carrying out operations of devices and/or systems discussed above with respect to FIGS. 1-3 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to message flow, flowchart and/or block diagram illustrations of methods, devices, and/or computer program products in accordance with some embodiments of the invention. These message flow, flowchart and/or block diagrams further illustrate exemplary operations for processing location information received at a client device, from, for example, a server device in accordance with various embodiments of the present invention. It will be understood that each message/block of the message flow, flowchart and/or block diagram illustrations, and combinations of messages/blocks in the message flow, flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the message flow, flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the message flow, flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the message flow, flowchart and/or block diagram block or blocks.

Operations for processing location information at a client device that is received, for example, from a server device, will now be described with reference to FIGS. 4 and 5 and the network and client device architectures of FIGS. 2 and 3, respectively. Operations begin at block 400 where a client device 220a, 220b establishes communication with a server device 260. The client device 220a, 220b receives a message that contains information associated with a first and/or a second location from the server device 260 at block 410. The location information in the message is associated with a navigation module, such as navigation module 375, on the client device. As a result, at block 420, the navigation module 375 extracts the location information from the received message and processes the location information to obtain a navigation track between the first and the second location. In accordance with some embodiments of the present invention, one of first and second locations may be a current location of the client device. Moreover, as the current location of the client device changes, the navigation module 375 may update the navigation track based on the new location of the client device. In other embodiments, neither of the first and second locations is a current location of the client device.

Figure 4:
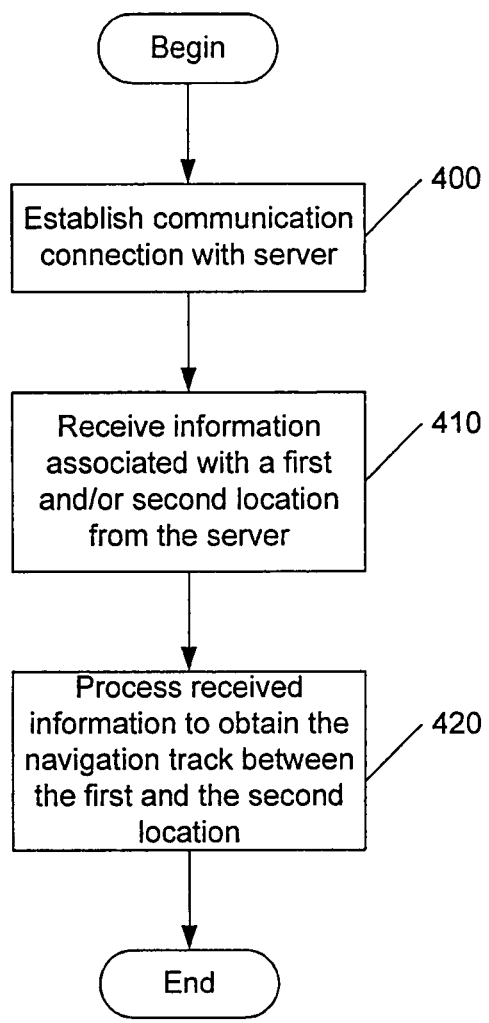
FIGS. 4 and 5 are flowcharts that illustrate operations of client devices and server devices, respectively, for obtaining a navigation track at a client device based on location information received from a server device in accordance with some embodiments of the present invention.
Figure 5:
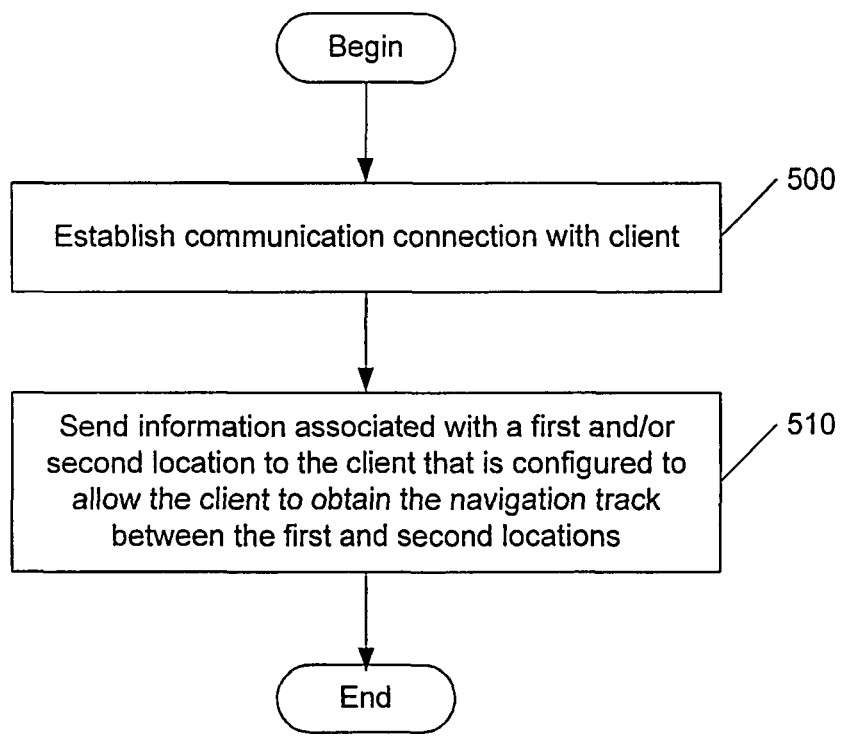

Referring to FIG. 5, exemplary server device operations begin at block 500 where the server device 260 establishes communication with a client device 220a, 220b. At block 510 the server device 260 sends a message containing information associated with a first and/or a second location to the client device 220a, 220b that is configured to allow the client device to obtain the navigation track between the first and second locations as discussed above with respect to FIG. 4. In some embodiments, the client device 220a, 220b may send the first location, the second location, or both the first and second locations to the server device 260 before the server device sends the message containing the location information back to the client device 220a, 220b.

Figure 6:
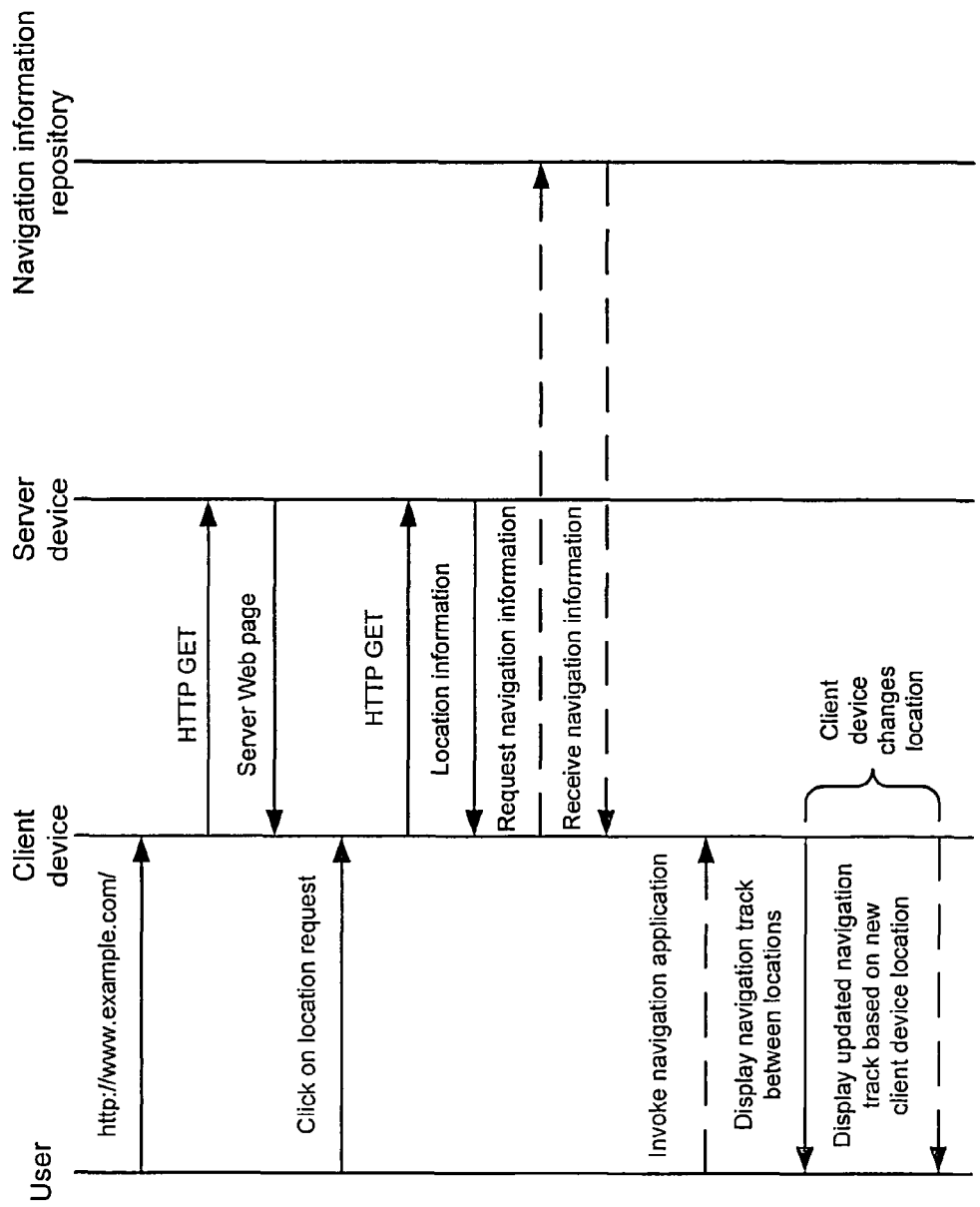
FIG. 6 is a message flow diagram that illustrates operations for processing location information at a client device to obtain a navigation track in accordance with some embodiments of the present invention.

FIG. 6 is a message flow diagram that illustrates operations for processing location information at a client device to obtain a navigation track in accordance with some embodiments of the present invention. Referring to FIG. 6 and the network and client device architectures of FIGS. 2 and 3, a user of a client device 220a, 220b enters the URL (http://www.example.com/) for the server 260. The client device 220a, 220b does an HTTP:GET towards the Internet site www.example.com, which is the domain name of the server 260. The server 260 may be associated, for example, with a sports franchise and may respond to the client device 220a, 220b with a Web page that includes a hyperlink to the location for the team's stadium.

The client device user clicks on the hyperlink to request the stadium location, which causes the client device 220a, 220b to do an HTTP:GET towards the server 260. The server 260 responds with a Web page that includes location information for the stadium. The stadium location information is either attached to the Web page (e.g., downloadable therefrom) or embedded therein and is detected by the navigation module 375 on the client device 220a, 220b. In some embodiments, the client device 220a, 220b may request navigation information from the navigation information repository server 250 to facilitate processing the stadium location information. Moreover, in accordance with various embodiments of the present invention, the user may invoke the navigation module 375 to process the stadium location information by, for example, clicking on an icon for the navigation module or an icon for the location information, or the navigation module 375 may process the stadium location information automatically. In some embodiments, the user of the client device 220a, 220b may elect to save the location information where it may be processed later even after the communication session with the server 260 has ended.

In the example shown in FIG. 6, the navigation module 375 may process the stadium location information provided by the server 260 and display a navigation track between a current location of the client device 220a, 220b and the stadium location. If the client device is a mobile terminal 220a, then the navigation module 375 may update the navigation track between the current location of the mobile terminal 220a and the stadium location as mobile terminal 220a changes location.

The flowchart/message flow diagrams of FIGS. 4-6 illustrate the architecture, functionality, and operations of embodiments of methods, client devices, server devices, and/or computer program products for obtaining a navigation track at a client device based on location information obtained from a server device. In this regard, each block and/or message and associated communication represents a module, segment, or portion of code, which comprises one or more executable instructions for implementing the specified logical function(s). It should also be noted that in other implementations, the operation(s) noted in the blocks/messages may occur out of the order noted in FIGS. 4-6. For example, two blocks/messages shown in succession may, in fact, be communicated substantially concurrently or the blocks/messages may sometimes be communicated in the reverse order, depending on the functionality involved.

Some embodiments of the present invention may be illustrated by way of example. FIGS. 7-10 illustrate navigation tracks that are generated by a navigation module on a client device based on location information received from a server in accordance with various embodiments of the present invention.

Figure 7:
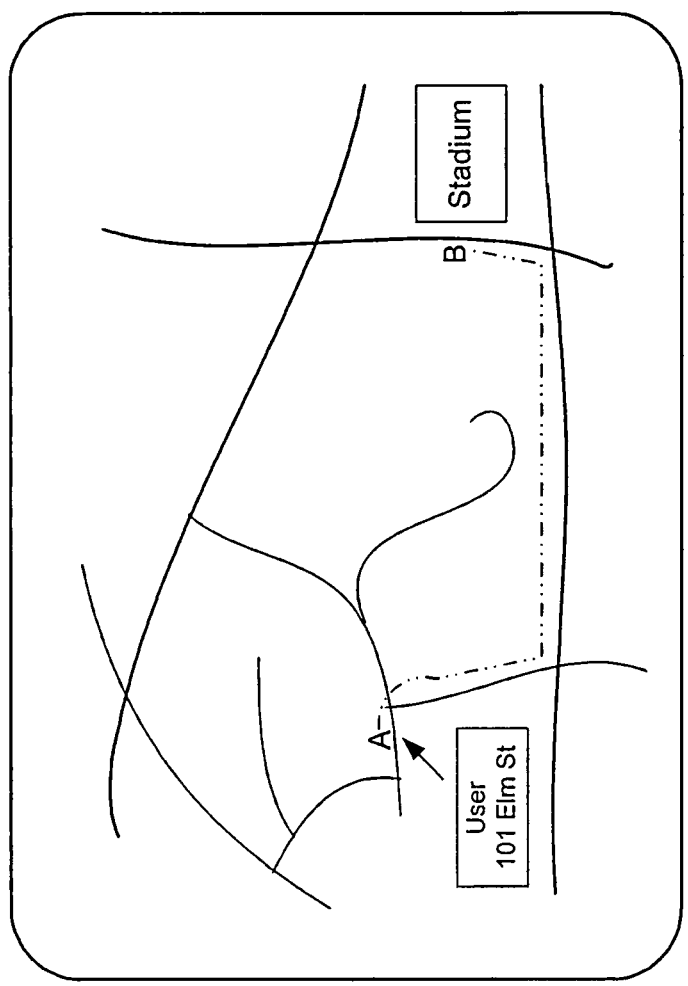
FIGS. 7-10 are client device displays that illustrate the presentation of a navigation track to a user of a client device in accordance with some embodiments of the present invention.
Figure 8:
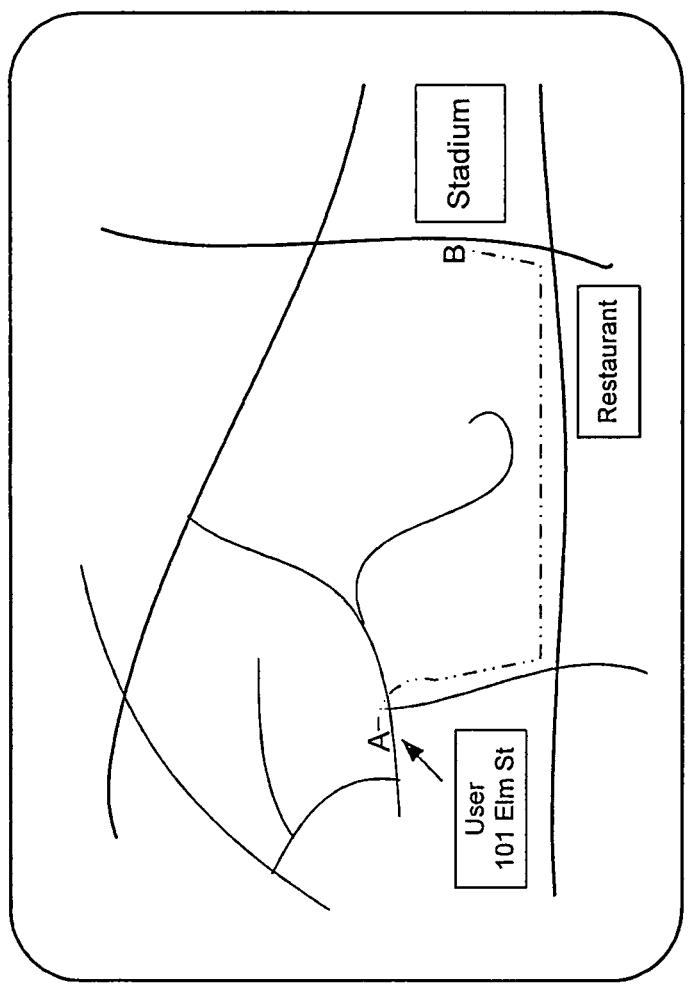

Referring to FIG. 7, this navigation track example is similar to the one described above with respect to FIG. 6. A user of a client device at 101 Elm St. obtains location information for a sports stadium from, for example, a Web page downloaded team's Web site. The navigation module on the client device processes the location information for the stadium as described above to determine a navigation path from the user's current location (point A) to the stadium (point B). Referring now to FIG. 8, the location information for the stadium or the navigation information/data available locally and/or remotely via a navigation information repository server may include one or more waypoints. Waypoints are sets of coordinates that identify a point in physical space. These coordinates may include longitude and latitude. Waypoints are often associated with distinctive features, such as rock formations, springs, oases, mountains, buildings, roadways, waterways, railways, and the like. As shown in FIG. 8, the navigation track includes a waypoint in the form of a restaurant. This may assist the user in finding the stadium at point B as the restaurant is an indication that the user is approaching an intersection where a turn on to a new road is required.

Figure 9:
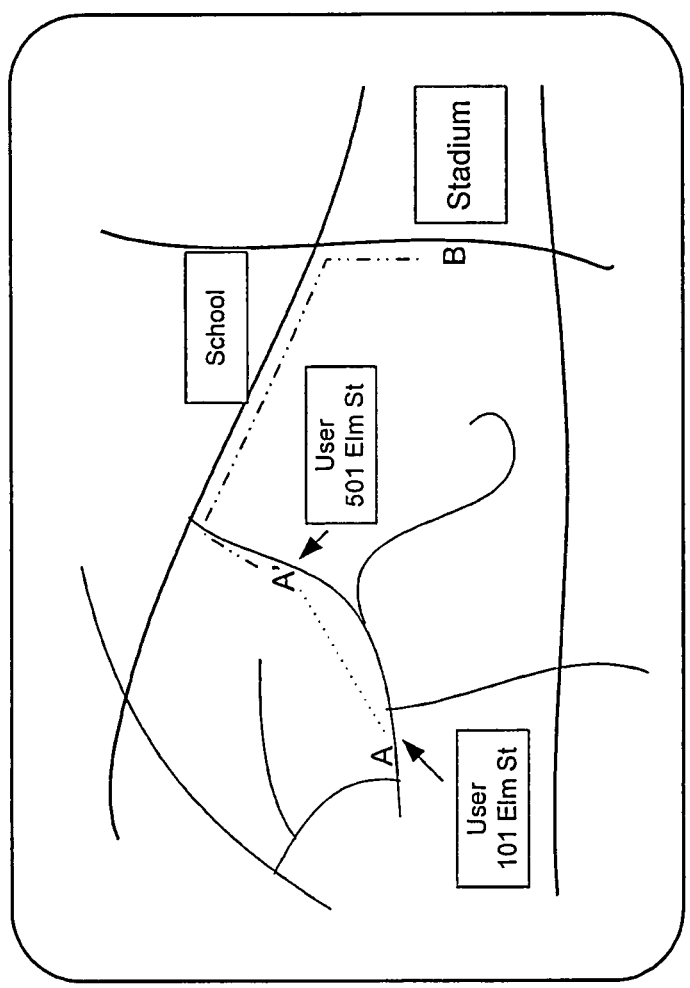

FIG. 9 illustrates a variation on the examples of FIGS. 7 and 8. In this example, the user of the client device proceeds to 501 Elm St. to pick up a friend to go to the stadium. By changing locations, however, the original navigation path to the stadium is no longer the most desirable one. Accordingly, the navigation module on the user's client device detects the change in location and determines a new navigation path from 501 Elm St. (point A') to the stadium at point B. A new waypoint corresponding to a school is also provided to alert the user that a turn is upcoming.

Figure 10:
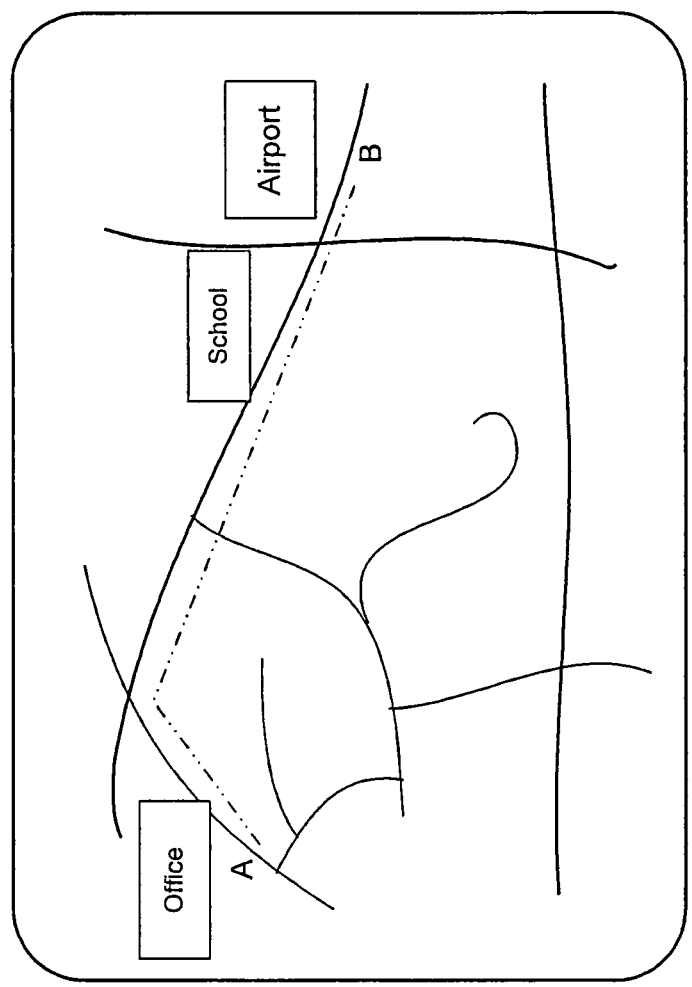

FIG. 10 illustrates an example in which the navigation path is between two locations not associated with the current location of the client device. For example, the user of the client device may be at home purchasing airline tickets for a business trip. On the airline's Website, the user provides the address of his/her office location as the user will be driving to the airport from the office. The airline sends the user an email with an attachment that includes location information associated with the user's office location and the local airport. The navigation module on the user's client device extracts the location information from the email from the airline and allows the user to save the location information in a local file. On the day of the trip, the user clicks on the location information file, which triggers the navigation module on the client device to process location information and generate a navigation track between the user's office (point A) and the airport (point B). A waypoint corresponding to a school is provided to alert the user that the airport is coming up soon.

Many variations and modifications can be made to the embodiments without substantially departing from the principles of the present invention. All such variations and modifications are intended to be included herein within the scope of the present invention, as set forth in the following claims.

That which is claimed:

1. A method of operating a client device, comprising:
    establishing a communication connection with a server device;
    receiving a message at the client device from the server device, responsive to establishing the communication connection, that contains information that identifies one of a first geographic location and a second geographic location from the server device, the information being associated with a navigation module on the client device;
    processing the information that identifies one of the first geographic location and the second geographic location using the navigation module at the client device to obtain processed information; and
    determining a geographic navigation track between the first geographic location and the second geographic location based on the processed information without traversing the geographic navigation track;
    wherein the message comprises one of a Short Message Service text message and an electronic mail.

2. The method of claim 1, further comprising, before processing the information:
    saving the information at the client device; and
    ending the communication connection with the server device.

3. The method of claim 1, wherein the server device is a Web server device and wherein the communication connection is a HyperText Transfer Protocol communication connection.

4. The method of claim 1, wherein processing the information comprises:
    accessing a navigation information repository on the client device.

5. The method of claim 1, wherein processing the information comprises:
    accessing a remote navigation information repository via a communication connection with the remote navigation information repository.

6. The method of claim 1, wherein the first geographic location is a current geographic location of the client device.

7. The method of claim 6, further comprising:
    updating the determined navigation track responsive to changes in the current geographic location of the client device.

8. The method of claim 1, wherein the information that identifies at least one of the first geographic location and the second geographic location comprises an address.

9. The method of claim 1, further comprising:
    sending one of the first geographic location and the second geographic location to the server device before receiving the message.

10. The method of claim 1, wherein the information that identifies one of the first geographic location and the second geographic location comprises global positioning system information.

11. The method of claim 10, wherein the global positioning system information is encoded in a Global Positioning System eXchange format.

12. The method of claim 1, wherein the information that identifies one of the first geographic location and the second geographic location comprises a waypoint between the first geographic location and the second geographic location; and
    wherein the navigation track between the first geographic location and the second geographic location includes the waypoint.

13. The method of claim 1,
    wherein the information is an attachment to the message.

14. The method of claim 1, wherein the information that identifies at least one of the first geographic location and the second geographic location comprises cellular technology location information.

* * * * *